March 25, 1958 W. A. SHURCLIFF 2,827,823
SYNCHRONIZATION INDICATOR FOR PLURAL PROJECTED IMAGES
Filed Oct. 7, 1953
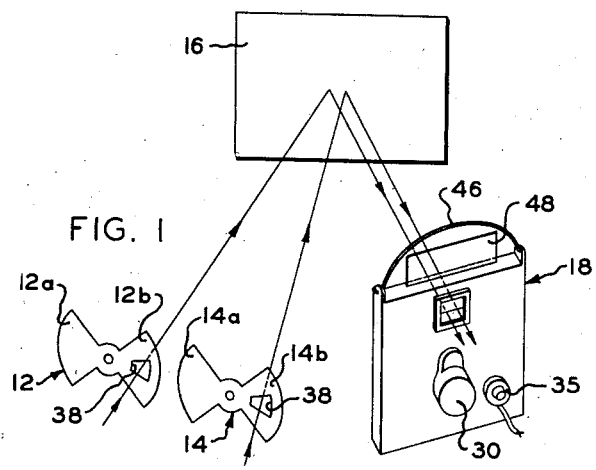
FIG. 1
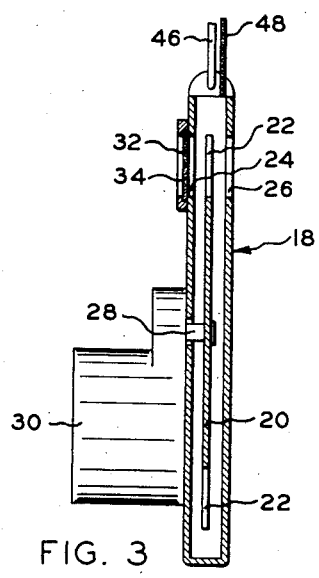
FIG. 3
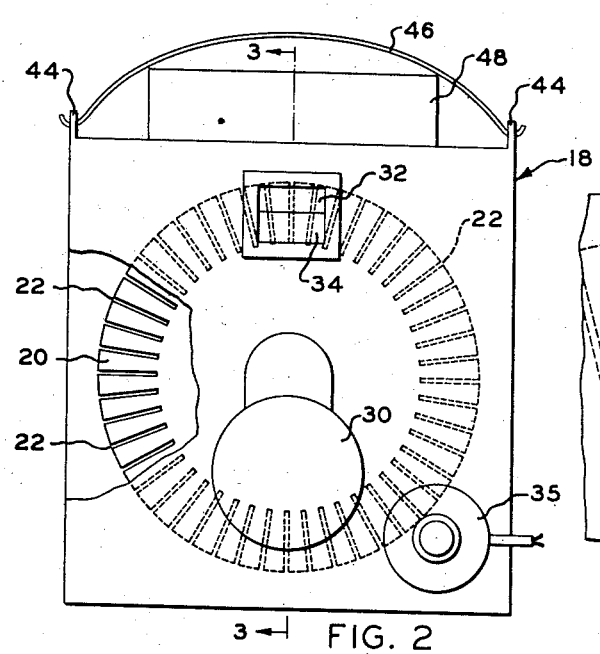
FIG. 2
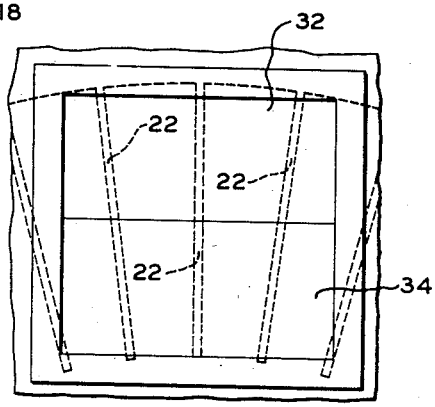
FIG. 4
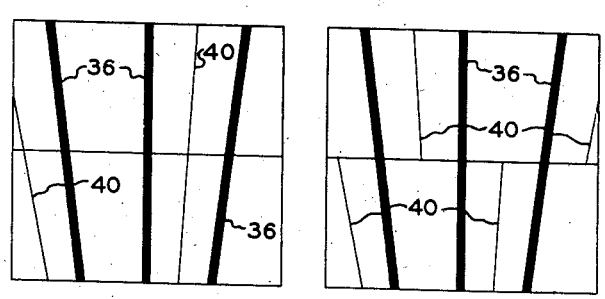
FIG. 6    FIG. 7
FIG. 5
INVENTOR
William A. Shurcliff
BY Brown and Mikulka
ATTORNEYS United States Patent Office 2,827,823
Patented Mar. 25, 1958

2,827,823

SYNCHRONIZATION INDICATOR FOR PLURAL PROJECTED IMAGES

William A. Shurcliff, Cambridge, Mass., assignor to Polaroid Corporation, Cambridge, Mass., a corporation of Delaware Application October 7, 1953, Serial No. 384,733

8 Claims. (Cl. 88—14)

The present invention relates generally to devices for, and methods of, measuring the synchronization error between two moving, closely related records such, for example, as a pair of stereoscopically related motion picture films.

Stereoscopic motion pictures depend for their effect of realism upon the simultaneous conveyance to the viewer of two distinct although closely related pictures. One of these pictures represents the scene as it would be viewed by an observer's left eye, and the other picture represents the scene as it would be viewed by an observer's right eye, and optical means are provided for rendering only the left-eye picture visible to the left eye of the observer and only the right-eye picture visible to the right eye as both pictures are simultaneously projected on the motion picture screen. The only practical system so far devised for this purpose is one in which the stereoscopic pairs of pictures are projected on the screen in differently polarized light and in which the spectator is provided with polarizing spectacles whic optically separate the two images so that one only becomes visible to each eye. Of the several such systems which have been proposed for the projection of stereoscopic motion pictures, the one which has proven most adaptable to existing projection facilities involves two separate films, one of which carries the left-eye and the other the right-eye scenes. These are thrown on the screen simultaneously by two projectors. It will be readily appreciated that any error in synchronization between the stereoscopically related images of the films will adversely affect the stereoscopy and will be a source of discomfort and annoyance to the viewer. It becomes important, therefore, to find and to promptly correct such errors. These errors may originate from any of several sources. Errors may be introduced during the loading of the projectors or in the splicing of the films. They may also arise from the failure of the projectors to stay in synchronism although started in synchronism. The last-named error is especially difficult to detect and yet is one which occurs in electrically synchronized projectors by virtue of the slipping of the selsyn motors and in mechanical systems by the play in the connecting links between the projectors.

One object of the present invention accordingly is to provide simple and effective apparatus to determine the extent of synchronization error between a pair of moving, closely related records such, for example, as a pair of stereoscopic motion picture films.

Another object of the invention is to provide simple stroboscopic means associated with each of a pair of projectors which is effective to give immediate visual indication of the extent of the error of synchronization between a pair of projected stereoscopic pictures.

Other objects and features of the invention will in part be obvious and will in part appear hereinafter.

The invention accordingly comprises the apparatus possessing the construction and combination of elements and arrangement of parts which are exemplified in the following detailed disclosure, and the scope of the application of which will be indicated in the claims.

For a more complete understanding of the nature and objects of the invention, reference should be had to the following detailed description taken in connection with the accompanying drawing wherein:

Figure 1 is a diagrammatic view illustrating one form of the invention;

Fig. 2 is a view in elevation, partly broken away, illustrating one form of the stroboscopic means for measuring the synchronization error;

Fig. 3 is a vertical view in section taken along the line 3—3 of Fig. 2;

Fig. 4 is an enlarged, detailed, fragmentary view of the window area of the instrument;

Fig. 5 illustrates a modified form of shutter adapted for use in the present invention;

Fig. 6 illustrates the pattern which appears in the window when the frames are perfectly synchronized; and Fig. 7 is a view similar to Fig. 6 but illustrating the pattern which appears when the stereoscopic view is one-half frame out of synchronization.

According to the present invention, there is provided an apparatus for determining the synchronization error of stereoscopically related pairs of motion picture films wherein one of said films carries the left-eye, and the other the right-eye view. As hereinbefore stated, each of the pictures of the stereoscopic pair differs from the other in that it represents a slightly different view of the scene, but the differences are only in fine detail and perspective and the brightness or the luminescence of each of the views of a stereoscopic pair is essentially identical. It is difficult, therefore, to determine by inspection only whether or not the views are in synchronization.

Stereoscopic motion picture films during projection are seldom out of synchronization by more than one frame. Ordinarily, determination of the error of synchronization between a pair of stereoscopically related films is in fractions of a frame, and adjusting to synchronization within the limits of a single frame is usually sufficient for all practical purposes. However, if the projectors are out of synchronization by more than a single frame, the operator will first bring the projectors into synchronization as to single frames. If, however, synchronization still appears to be bad, he will change the phase by holding frames to the right or to the left until the views are synchronized. Usually the views need only be shifted one or two frames, but if the views are out of synchronization by more than one or two of these frames, the operator will shift either right or left frames to the number necessary to provide perfect synchronization.

The construction illustrated diagrammatically in Fig. 1 of the drawing comprises a pair of synchronized projectors having shutters 12 and 14 of usual construction. The shutters 12 and 14 are rotated in the usual manner at a speed of twenty-four revolutions per second. Each shutter comprises a pair of blades 12a, 12b and 14a, 14b which are arranged to shut off light passing through the stereoscopic films. The blades or sectors 12a and 14a are so arranged that they are in position to block or cut off light during the time that the stereoscopic films are being advanced to move the next successive frames into projecting position. The sectors 12b and 14b serve merely to reduce "flicker" by causing "the shutter open and shut cycle" to occur at the rate of forty-eight cycles per second instead of twenty-four cycles per second, the light from the projectors passing through the film frames and its projector onto a motion picture screen 16 having the usual type of light-reflecting surface. The projectors, together with the shutters 12 and 14, must be operated in synchronism and to this end the projector mechanisms are connected by means of any suitable synchronizing mechanism such, for example, as that disclosed in application for United States Letters Patent, Serial No. 360,404, filed June 9, 1953 in the name of Maxfield Parrish, Jr., now abandoned. By the use of synchronizing mechanism of this type, simultaneous projection of a pair of stereoscopic pictures is insured since the projectors must necessarily operate at the same rate of speed. Even though the proper pair of frames are in corresponding positions in each projector and the projectors are started simultaneously, under some conditions the two projectors may be sufficiently out of synchronism to cause the viewer discomfort. This may be due to slower starting of one projector than the other, or it may be due to improper splicing or to various other factors which contribute to cause the projectors to become out of synchronism.

Although errors in synchronization may be sufficient to cause ultimate trouble and discomfort to the viewer, it is difficult to make certain that the frames are exactly synchronized with the aid of only the usual viewers.

The present invention contemplates the use of a simple and inexpensive apparatus which will directly and quickly indicate to the operator whether or not the stereoscopic frames are properly synchronized. As illustrated, one embodiment of the invention contemplates the use of a stroboscopic arrangement which indicates the degree of synchronization error in terms of fractional frames but does not indicate gross errors of more than a single frame.

The illustrated device comprises an enclosing casing 18 having mounted therein a rotating disk 20 which is provided with forty-eight slots 22 which are of sufficient length to span the vertical length or height of a window opening 24 formed in the front wall of the enclosing casing 18. The rear wall of the enclosing casing 18 is provided with an aligned opening at 26. The disk 20 is mounted on a shaft 28 which is connected by suitable gearing to a synchronous motor 30 which is arranged to rotate the disk 20 at a speed of one revolution per second. The window opening 24 is covered by two horizontal strips of linear polarizer, one strip 32 having its polarization axis at $+45°$ and the other strip 34 having its polarization axis at $-45°$. Electric current for operating the motor 30 is supplied from any suitable source and may be controlled by a suitable rheostat 35.

Slots 22 in the disk 20 are equally spaced about peripheral positions thereof and thus pass by the window 24 at the same time interval that the opaque blades of each of the shutters 12 and 14 cut off light from the projector. The shutter 12 rotates at twenty-four revolutions per second and since it has two opaque blades or sectors 12a or 12b, the light at the window 24 coming from the corresponding projector and reflected from the screen 16 is cut off forty-eight times per second. The slots 22 in the disk 20 permit streaks or stripes of light to pass through the polarizers 32 and 34 in the window 24. Since the time interval of the shutter blades and the slots 22 is the same, the slots 22 will appear as stationary stripes of light through the polarizing strips 32 and 34. In order to determine whether or not the shutters 12 and 14 are properly synchronized in terms of whole frames, slots 38 are provided in identical positions of the flicker blades 12b and 14b. Thus each flicker blade will permit a streak of light to pass although it shuts off light from the rest of each of the frames in projecting position. These streaks of light appear as thin lines 40 when viewed through the polarizing strips 32 and 34 covering the window 24. Since the shutters 12 and 14 rotate only twenty-four revolutions per second, the stripes of light 40 will appear only between alternate pairs of heavy stripes 36. If the shutters 12 and 14 are perfectly synchronized, the pattern will appear through the window 24, as shown in Fig. 6, with the heavy stripes of light 36 on both polarizing strips being perfectly aligned, and the thin or narrow stripes 40 will also be aligned. This, however, does not necessarily mean that the frames of a stereoscopic pair are being viewed in synchronism since the frames may still be out of phase by one or more whole frames. In such case the operator will change the phase on one film by one whole frame. If the phase is still bad, he will change the phase two frames in the opposite direction on the other film. Usually, this procedure will correct the error, but if it fails to do so, the procedure may be repeated by changing the phase as many frames as may be necessary in either direction until the frames of a stereoscopic pair are in perfect synchronism.

In order to determine how many whole frames are out of synchronism, the present apparatus is provided with a light filter 48 which is stained with a suitable dichroic dye which is characterized by unequal absorption for two oppositely polarized beams of incident light. The dichroic dye may be a red dichroic dye which appears red when viewed by light having the light polarization of the right-eye picture and appears substantially colorless when viewed in light having the light polarization of the left-eye picture. This filter 48 may be fixed to the top of the enclosing casing 18 in any suitable manner. After the operator has viewed the pattern formed on the two polarizing strips 32 and 34, and the light stripes 36 and 40 thereon are in alignment, the two pictures may still be out of synchronization. If this is so, the operator may change the phase one whole frame to the right. If the appearance is still bad, he will change the phase two frames to the left. Such a procedure will almost always cure the difficulty. If the synchronization error is larger and the operator is badly confused as to which way to adjust the projectors, he will remove his viewers and look at the screen through the red dichroic filter 48. If, for example, the right-eye film is two frames ahead, the two images which he sees on the screen will appear to move with slight time delay, the red image appearing always to be slightly ahead. When this condition exists, the adjustment knob on the synchronizing mechanism must be turned to the left until the red image and the colorless image appear to be prefectly matched. On the other hand, if the colorless picture or image appears to be ahead, then the operator will turn the adjustment knob of the synchronizing mechanism to the right until the red and colorless images are perfectly matched.

The present apparatus is easily installed. As shown in Fig. 2, the device is provided with a pair of vertical ears 44 which receives a wire bail 46 by the use of which the device may be suspended in front of any one of the ports of the projection booth. When the projectionist wishes to determine whether or not the films are in synchronism, he removes his viewer and stands about a foot from the apparatus and looks through the window 24. He holds his head roughly in such a position that, as he looks through the window, he is looking in the general direction of the screen. After the operator has synchronized the projectors, the apparatus may be left "on" with the disk rotating. Thus the device is ready for use at any time.

It is evident from the above that the apparatus illustrated and described herein forms a simple and effective means for synchronizing a pair of motion picture projectors carrying a stereoscopic film. The device is inexpensive both to manufacture and to operate. The average motion picture projector operator can learn how to use the device in a matter of minutes. Furthermore, the device, because of its simplicity, will require little or no servicing or repair.

Although the above-described system for determining synchronization has been described with particular reference to an arrangement for indicating a synchronization error between a pair of moving stereoscopic films, it is to be understood that in its broader and underlying aspects the invention may be used in determining the synchronization of any pair of conjugate records.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. A device for indicating the extent of synchronization between two projected records of substantially oppositely polarized light wherein said records are projected through shuttering arrangements which produce on a screen a first main record in one polarized light, a first minor record in the same polarized light displaced in time with respect to said first main record, a second main record in the oppositely polarized light and a second minor record in said oppositely polarized light displaced in time with respect to said second main record; said device comprising a housing; a window in said housing, said window comprising two viewing portions positioned therein, one said portion being constituted so as to transmit predominantly the polarized light reflected from said screen from one record only and the other said portion being constituted so as to transmit predominantly the oppositely polarized light reflected from said screen from said other record only, a rotatable element in said housing; means to drive said element so that it moves in timed relationship with said shuttering arrangement; means to control the rate of rotation of said element; said rotatable element comprising a plurality of spaced apertures so placed that upon rotation said apertures move across the viewing paths of both of said portions concurrently and transmit visible intelligible patterns of light indicating the synchronization error of said records.

2. A system for indicating the synchronization error of a pair of advancing stereoscopic motion picture films comprising means including a pair of projectors; a shutter in each projector moving in timed relationship with said films for projecting in substantially oppositely polarized light successive stereoscopic frames of said films on a reflecting screen, each of said shutters having pairs of alternating opaque and aperture sectors, similar opaque sectors of each shutter having a small aperture therein for permitting the momentary passage of light from said projectors to said screen; a housing; a window in said housing, said window comprising two viewing portions positioned therein, one said portion being constituted to transmit predominantly the polarized light reflected from said screen from one film only, the other portion being constituted to transmit predominantly the polarized light reflected from said screen from the other film only; a rotatable element in said housing; means to drive said rotatable element so that it moves in timed relationship with said shutters; means to regulate the rate of rotation of said rotatable element; said rotatable element comprising a plurality of spaced apertures so placed that upon rotation said apertures move across the viewing paths of both of said portions concurrently and transmit intelligible patterns of light indicating the synchronization error between said films in terms of a frame or less.

3. A system for indicating the synchronization error of a pair of advancing stereoscopic motion picture films, comprising means including a pair of projectors; a shutter in each projector moving in timed relationship with said films for projecting in substantially oppositely polarized light successive stereoscopic frames of said films on a reflecting frame; each of said shutters having pairs of alternating opaque sectors and aperture sectors, similar opaque sectors of each shutter having a small aperture therein for permitting the momentary passage of light from said projectors to said screen, a housing; a window in said housing, said window comprising two viewing filters positioned therein, one filter being polarized and positioned to transmit predominantly the polarized light reflected from said screen from one film only and the other filter being positioned and polarized to transmit predominantly the oppositely polarized light reflected from said screen from the other film only; a rotatable disk in said housing; means to drive said disk so that it moves in timed relationship with said shutters; means to control the rate of rotation of said disk; said disk having a plurality of substantially equally spaced radially extending slots so placed that upon rotation said slots will move across the viewing paths of both of said filters concurrently and transmit an intelligible pattern of light indicating the synchronization error of said films in terms of a frame or less.

4. An apparatus for indicating the synchronization error between a pair of projected stereoscopic motion picture films wherein said films are projected in substantially oppositely polarized light through shuttering arrangements which produce on a screen a first main image in one polarized light, a first minor image in the same polarized light displaced in time with respect to said main image, a second main image in substantially oppositely polarized light, a second minor image in said substantially oppositely polarized light displaced in time with respect to said second main image, said device comprising a housing; a window in said housing, said window comprising two viewing portions positioned therein, one said portion being constituted to transmit predominantly the polarized light reflected from said screen from one film only and the other portion being polarized and positioned to transmit predominantly the oppositely polarized light reflected from said screen from the other film only; a rotatable element in said housing, means to drive said element so that it moves in timed relationship with said shuttering arrangement; means to control the rate of rotation of said rotatable element; said rotatable element comprising a plurality of spaced apertures so placed that upon rotation said apertures move across the viewing paths of both of said portions concurrently and transmit an intelligible pattern of light indicating the synchronization error between said films in terms of a frame or less.

5. A device for determining the extent of synchronization between two projected records of substantially oppositely polarized light wherein said records are projected through shuttering arrangements which produce on a screen a first main record in one polarized light, a first minor record in the same polarized light displaced in time with respect to said first main record, a second main record in the oppositely polarized light and a second minor record in said oppositely polarized light displaced in time with respect to said second main record; said device comprising a housing; a window in said housing; said window comprising two viewing filters positioned therein, one filter being polarized and positioned to transmit predominantly the polarized light reflected from said screen from one record only and the other filter being positioned and polarized to transmit predominantly the oppositely polarized light reflected from said screen from said other record only; a rotatable disk in said housing; means to drive said disk so that it moves in timed relationship with said shuttering arrangement; means to control the rate of rotation of said disk, said disk having a plurality of substantially equally spaced radially extending slots so placed that upon rotation said slots will move across the viewing paths of both of said filters concurrently and transmit an intelligible pattern of light indicating the synchronization error of said films.

6. An apparatus for indicating the synchronization error between a pair of projected stereoscopic motion picture films wherein said films are projected in substantially oppositely polarized light through shuttering arrangements which produce on a screen a first main image in one polarized light, a first minor image in the same polarized light displaced in time with respect to said main image, a second main image in substantially oppositely polarized light, a second minor image in said substantially oppositely polarized light displaced in time with respect to said second main image, said device comprising a housing; a window in said housing, said window comprising two viewing filters positioned therein, one filter being polarized and positioned to transmit predominantly the polarized light reflected from said screen from one film only, and the other filter being polarized and positioned to transmit predominantly the oppositely polarized light reflected from said screen from the other film only, a rotatable disk in said housing, means to drive said disk in timed relationship with said shuttering arrangement, means to control the rate of rotation of said disk, said rotatable disk comprising a plurality of substantially equally spaced slots so placed that upon rotation said slots move across the viewing paths of both of said filters concurrently and transmit an intelligible pattern of light indicating the synchronization error between said films.

7. A system for indicating the synchronization error of a pair of advancing stereoscopic motion picture films, comprising means including a pair of projectors, a shutter in each projector moving in timed relationship with said films for projecting in oppositely polarized light successive stereoscopic frames of said films on a reflecting screen; each of said shutters having pairs of alternating opaque and aperture sectors, similar opaque sectors of each shutter having a small aperture therein for permitting the momentary passage of light from said projector to said screen; a housing, two viewing windows in said housing, one of said windows having a viewing filter for determining gross errors, said filter being stained with a dichroic dye and adapted to substantially transmit the polarized light reflected from said screen from one of said films and substantially absorb the oppositely polarized light reflected from said screen from the other film, the other window comprising two viewing portions positioned therein, one said portion being constituted to transmit predominantly the polarized light reflected from said screen from one film only and the other said portion being constituted to transmit predominantly the oppositely polarized light reflected from said screen from the other film only; a rotatable element in said housing, means to drive said rotatable element in timed relationship with said shutters, means to regulate the rate of rotation of said rotatable element, said rotatable element comprising a plurality of spaced apertures so placed that upon rotation said apertures move across the viewing paths of both of said portions concurrently and transmit an intelligible pattern of light indicating the synchronization error between said films in terms of a frame or less.

8. A system for indicating the synchronization error between a pair of advancing stereoscopic motion picture films comprising means including a pair of projectors, a shutter in each projector moving in timed relationship with said films for projecting in oppositely polarized light successive stereoscopic frames of said films on a reflecting screen; each of said shutters having pairs of alternating opaque and aperture sectors, similar opaque sectors of each shutter having a similar aperture for permitting the momentary passage of light from said projector to said screen, a housing, two viewing windows in said housing, one of said windows having a viewing filter for determining gross errors in synchronization, said filter being stained with a dichroic dye adapted to substantially transmit the polarized light reflected from said screen from one of said films and to substantially absorb the oppositely polarized light reflected from said screen on the other film, the other window comprising two viewing filters positioned therein, one filter being polarized and positioned to transmit predominantly the polarized light reflected from said screen from one film only, and the other filter being polarized and positioned to transmit predominantly the oppositely polarized light reflected from said screen from the other film only, a rotatable disk in said housing, means to drive said disk so that it rotates in timed relationship with said shutters, means to control the rate of rotation of said disk, said disk having a plurality of substantially equally spaced radially extending slots so placed that upon rotation said slots move across the viewing paths of both of said filters concurrently and transmit an intelligible pattern of light indicating the synchronization error of said films in terms of a frame or less.

References Cited in the file of this patent
UNITED STATES PATENTS

| | | |
|---|---|---|
| 1,472,608 | Macbeth | Oct. 30, 1923 |
| 1,506,524 | Hammond | Aug. 26, 1924 |
| 1,836,691 | Tuttle | Dec. 15, 1931 |
| 1,976,850 | Horton | Oct. 16, 1934 |
| 2,270,198 | Schensted | Jan. 13, 1942 |
| 2,309,879 | Willis | Feb. 2, 1943 |
| 2,384,259 | Quinby | Sept. 4, 1945 |
| 2,481,622 | Rosenthal | Sept. 13, 1949 |
| 2,651,771 | Palmer | Sept. 8, 1953 |